(12) United States Patent
Park et al.

(10) Patent No.: US 10,456,744 B2
(45) Date of Patent: Oct. 29, 2019

(54) METHODS AND SYSTEMS FOR CAPTURING AND STORING CARBON DIOXIDE

(71) Applicant: THE TRUSTEES OF COLUMBIA UNIVERSITY IN THE CITY OF NEW YORK, New York, NY (US)

(72) Inventors: Ah-Hyung Alissa Park, New York, NY (US); Edward J. Swanson, New York, NY (US); Huangjing Zhao, New York, NY (US); Greeshma Gadikota, New York, NY (US); Patrick V. Brady, Albuquerque, NM (US); Tushar Patel, New York, NY (US); Scott Banta, Fairfield, CT (US)

(73) Assignee: The Trustees of Columbia University in the City of New York, New York, NY (US)

( * ) Notice: Subject to any disclaimer, the term of this patent is extended or adjusted under 35 U.S.C. 154(b) by 142 days.

(21) Appl. No.: 15/423,691

(22) Filed: Feb. 3, 2017

(65) Prior Publication Data

US 2017/0333840 A1   Nov. 23, 2017

Related U.S. Application Data

(63) Continuation of application No. 14/237,690, filed as application No. PCT/US2012/049867 on Aug. 7, 2012, now abandoned.

(Continued)

(51) Int. Cl.
*B01D 53/84* (2006.01)
*B01D 53/62* (2006.01)

(Continued)

(52) U.S. Cl.
CPC .............. *B01D 53/84* (2013.01); *B01D 53/62* (2013.01); *B01D 53/86* (2013.01); *C01F 5/24* (2013.01);

(Continued)

(58) Field of Classification Search
CPC ........ B01D 53/84; B01D 53/62; B01D 53/86; B01D 2251/402; B01D 2251/404;

(Continued)

(56) References Cited

U.S. PATENT DOCUMENTS 5,849,567 A * 12/1998 Fischer ..................... B09C 1/02
                                                          435/262.5
2005/0180910 A1 * 8/2005 Park ........................ B01D 53/62
                                                          423/432

(Continued)

FOREIGN PATENT DOCUMENTS

EP    0800871 A1 * 10/1997 ............... A62D 3/33
EP    2332632 A1 *  6/2011 ......... B01D 53/1475

OTHER PUBLICATIONS

Kerry S. Smith, Claudia Jakubzick, Thomas Whitam and James G. Ferry. "Carbonic anhydrase is an ancient enzyme widespread in prokaryotes". Proceedings of the National Academy of Science. vol. 96, No. 26, pp. 15184-15189. Dec. 21, 1999. (Year: 1999).*

*Primary Examiner* — Michael L Hobbs
(74) *Attorney, Agent, or Firm* — Murtha Cullina LLP; Anthony P. Gangemi

(57) ABSTRACT

Methods and systems for capturing and storing carbon dioxide are disclosed. In some embodiments, the methods include the following: mixing materials including magnesium or calcium with one or more acids and chelating agents to form a magnesium or calcium-rich solvent; using the organic acids derived from biogenic wastes as acids or chelating agents; generating carbonate ions by reacting a gas including carbon dioxide with a carbonic anhydrase biocata- (Continued)

lyst; reacting the solvent with the carbonate ions to form magnesium or calcium carbonates; recycling a solution containing the biocatalyst after forming magnesium or calcium carbonates for re-use in the generating step; using the magnesium and calcium carbonates as carbon neutral filler materials and using the silica product as green filler materials or inexpensive absorbents.

13 Claims, 4 Drawing Sheets

Related U.S. Application Data

(60) Provisional application No. 61/521,328, filed on Aug. 8, 2011, provisional application No. 61/680,106, filed on Aug. 6, 2012.

(51) Int. Cl.
  *B01D 53/86* (2006.01)
  *C01F 5/24* (2006.01)
  *C01F 11/18* (2006.01)

(52) U.S. Cl.
  CPC ...... *C01F 11/183* (2013.01); *B01D 2251/402* (2013.01); *B01D 2251/404* (2013.01); *B01D 2251/90* (2013.01); *B01D 2251/902* (2013.01); *B01D 2255/804* (2013.01); *B01D 2257/504* (2013.01); *Y02C 10/04* (2013.01); *Y02P 20/152* (2015.11)

(58) Field of Classification Search
  CPC .......... B01D 2251/90; B01D 2255/804; B01D 2257/504; C01F 5/24; C01F 11/183; Y02C 10/04; Y02P 20/152
  USPC ...................................................... 435/289.1
  See application file for complete search history.

(56) References Cited

U.S. PATENT DOCUMENTS

2010/0077691 A1* 4/2010 Constantz ............... C04B 22/10
  52/596
2011/0091955 A1* 4/2011 Constantz ............. B01D 53/62
  435/168

* cited by examiner

METHODS AND SYSTEMS FOR CAPTURING AND STORING CARBON DIOXIDE

CROSS REFERENCE TO RELATED APPLICATION(S)

This application is a continuation of U.S. Non-Provisional patent application Ser. No. 14/237,690, filed Feb. 7, 2014, which is a National Stage filing of International Application PCT/US2012/049867, filed Aug. 7, 2012, and which claims the benefit of U.S. Provisional Application Nos. 61/521,328, filed Aug. 8, 2011, and 61/680,106, filed Aug. 6, 2012, each of which is incorporated by reference as if disclosed herein in its entirety.

STATEMENT REGARDING FEDERALLY SPONSORED RESEARCH OR DEVELOPMENT

This invention was made with government support under grant no. DOE ARPA-E 5-22614 awarded by the Department of Energy. The government has certain rights in the invention.

BACKGROUND

The rapid increase in carbon dioxide emissions from industrial sources has been considered one of the main causes for the Earth's changing climate. The reduction of carbon dioxide emissions can be achieved by improving energy efficiency, implementing renewable carbon-free energy sources, and developing carbon capture, utilization, and storage (CCUS) technologies. Worldwide energy use will continue increasing; and thus, CCUS could provide an immediate solution to the global carbon imbalance while renewable energy technologies develop. By sequestering carbon dioxide, the atmospheric carbon dioxide concentration can be stabilized or reduced. Most focus in the CCUS field has been placed on amine-based carbon dioxide capture combined with geological storage. While these technologies have already been demonstrated in large scales, amine-based carbon dioxide capture process and the geological storage of carbon dioxide still face challenges such as high parasitic energy consumption during solvent regeneration and the permanence and accountability issues for long term carbon dioxide storage. Furthermore, these schemes would not allow direct integration of carbon capture and storage with high temperature energy conversion systems.

A few high temperature carbon capture schemes exist that utilize a metal oxide as carbon capture medium such as Zero Emission Coal Alliance (ZECA) process and calcium looping technologies. Numerous studies have shown that Ca-based sorbents, often in the form of $Ca(OH)_2$ or CaO derived from CaCO3, provide substantial carbonation conversion and kinetics. Ca-based sorbents are attractive because they can be prepared using inexpensive resources such as limestone. However, since they are derived from carbonate mineral, Ca-based sorbents cannot be used as direct carbon storage. The spent sorbents need to be regenerated, requiring a significant cost and energy penalty, especially when accounting for sorbent degradation.

A more permanent way of preventing carbon dioxide from entering the atmosphere is a chemical conversion of carbon dioxide to a thermodynamically lower state. Carbon dioxide is the anhydrous form of carbonic acid and, therefore, can be used to displace weaker acids such as silicic acid. The formation of carbonates from silicates, which thermodynamically bind carbon dioxide, is a well-known process called mineral weathering. In many instances these carbonates dissolve in water, but some, such as magnesium or calcium carbonates, are remarkably stable as solids. Some of the geologically sequestered carbon dioxide will undergo mineral weathering with surroundings. However, the reaction between mineral and carbon dioxide is very slow in nature, and thus, the portion of carbon storage by mineralization is very limited in the geological sequestration. Mineral carbonation can also be performed using industrial wastes such as steel slags and fly ash. In particular, the use of stainless steel slags, which are considered to be hazardous wastes, results in carbon capture and storage with inherent treatment of hazardous wastes.

The main challenge for carbon mineral sequestration has been the slow dissolution kinetics of minerals. Most of the prior studies on carbon mineral sequestration focused on the pretreatment of the minerals, including heat treatment of serpentine and wet-attrition grinding of Mg-bearing minerals. These methods, however, are highly energy intensive and, since the current energy sources are generally fossil-based, the net amounts of carbon contained by those pretreatment schemes have been found to be significantly less than the amount of carbon dioxide reacted.

SUMMARY

Methods and systems according to the disclosed subject matter use carbon mineralization to provide permanent carbon storage which produces thermodynamically stable mineral carbonates. By capturing and storing carbon dioxide in a single process, technology according to the disclosed subject matter eliminates the energy-intensive and expansive solvent regeneration process and carbon dioxide compression process from the CCUS scheme. A novel enzymatic catalyst, carbonic anhydrase, is used in systems according to the disclosed subject matter to improve the hydration of carbon dioxide, lower the pH requirement for mineral carbonation and decrease associated energy costs. Therefore, methods and systems according to the disclosed subject matter provide an enhanced weathering technology that captures and stores large quantities of anthropogenic carbon dioxide with improved economic feasibility.

Methods and systems according to the disclosed subject matter provide the following: (a) chemically enhanced mineral and industrial waste dissolution using a mixture of chelating agents that target both Mg-, Ca- and Si-layers in the mineral matrix; (b) the use of engineered enzymatic catalysts, i.e., carbonic anhydrase, to enhance the hydration of gaseous carbon dioxide; (c) single step carbon capture and storage from industrial gaseous stream such as flue gas from a coal-fired power plant; and (d) the production of high quality solid magnesium, calcium, and silica containing byproducts as filler materials, i.e., paper fillers, rubber fillers, and plastic fillers, as well as inexpensive construction materials.

BRIEF DESCRIPTION OF THE DRAWINGS

The drawings show embodiments of the disclosed subject matter for the purpose of illustrating the invention. However, it should be understood that the present application is not limited to the precise arrangements and instrumentalities shown in the drawings, wherein.

DETAILED DESCRIPTION

Figure 1:
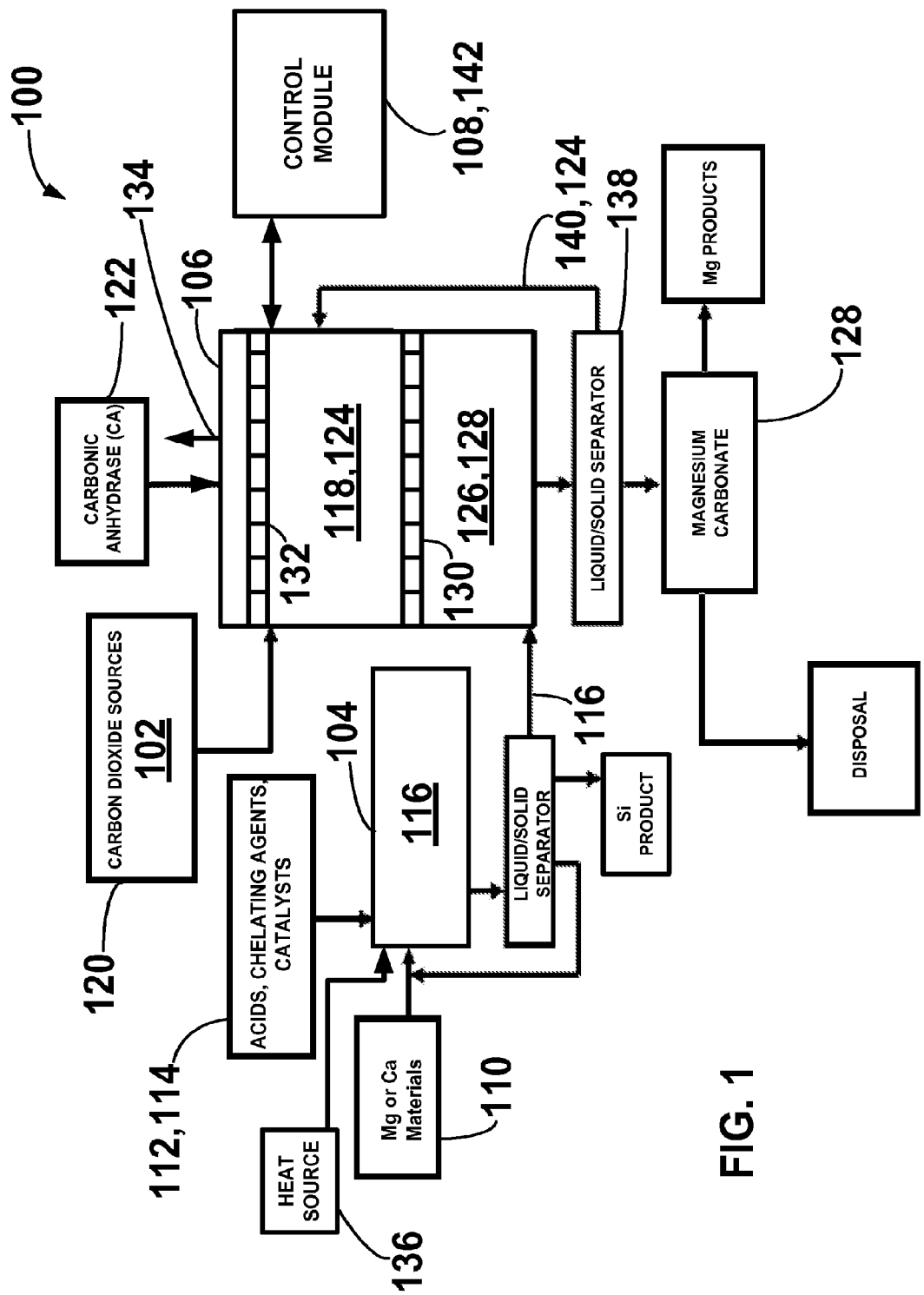
FIG. 1 is a schematic diagram of methods and systems according to some embodiments of the disclosed subject matter.

Referring now to FIG. 1, aspects of the disclosed subject matter include a system 100 for capturing and storing carbon dioxide 102. In some embodiments, system 100 includes a mineral dissolution reactor 104, a combined biocatalyst and carbonation reactor 106, and a control module 108.

Dissolution reactor 104 is configured for mixing materials 110 including magnesium or calcium, e.g., serpentine, olivine, basalt, labradorite, or similar including industrial wastes such as stainless steel slags, with at least one of one or more acids 112 and one or more catalysts or chelating agents 114 to form a magnesium or calcium-rich solvent 116.

Combined biocatalyst and carbonation reactor 106 is in fluid communication with dissolution reactor 104. In some embodiments, reactor 106 includes a first chamber 118 for reacting a gas 120 including carbon dioxide 102 with a biocatalyst 122 to form carbonate ions 124 and a second chamber 126 for reacting the carbonate ions with magnesium or calcium-rich solvent 116 to form magnesium or calcium carbonate 128. A first semi-porous distributor plate 130 separates first and second chambers 118 and 126, respectively, and a second and semi-porous distributor plate 132 separates first chamber 118 from a cleaned gas outlet 134.

Still referring to FIG. 1, system 100 includes a heat source 136 in fluid communication with dissolution reactor 104, which is configured to heat the dissolution reactor thereby increasing a temperature inside the reactor.

System 100 includes a carbonate ion recycle module 138 in fluid communication with combined biocatalyst and carbonation reactor 106 for recycling a solution 140 containing carbonate ions 124 after forming magnesium or calcium carbonates 128 in the reactor for re-use in the reactor.

In some embodiments, system 100 includes a biocatalyst recycle module (not shown) in fluid communication with combined biocatalyst and carbonation reactor 106 for recycling a solution containing biocatalyst 122 after forming magnesium or calcium carbonates 128 in the reactor for re-use in the reactor.

Still referring to FIG. 1, in some embodiments, system 100 includes a pH control module 142 in fluid communication with combined biocatalyst and carbonation reactor 106. pH control module 142 includes a supply of basic material, e.g., sodium hydroxide, ammonium hydroxide, or similar, for increasing pH in combined biocatalyst and carbonation reactor 106.

Control module 108 is used to control various valves, pumps, gauges (not shown) that control the flow of gas 120, biocatalyst 122, bearing materials 110 including magnesium or calcium, one or more acids 112, and one or more catalysts or chelating agents 114 to dissolution reactor 104 and combined biocatalyst and carbonation reactor 106. Control module 108 also controls heat source 136 and pH control module 142. Control module 108 typically includes both wired and wireless components.

In some embodiments, system 100 includes one or more liquid solids separators. Magnesium or calcium carbonates 128, which are formed, are either disposed of, e.g., in a reclaimed mine, etc., and/or used to make useful products such as fillers and/or construction materials.

In some embodiments, system 100 includes one or more liquid solids separators. Silica products from magnesium or calcium-rich solvent 116, which are reaction byproducts, are either disposed of, e.g., in a reclaimed mine, etc., and/or used to make useful products such as fillers and/or construction materials.

Figure 2:
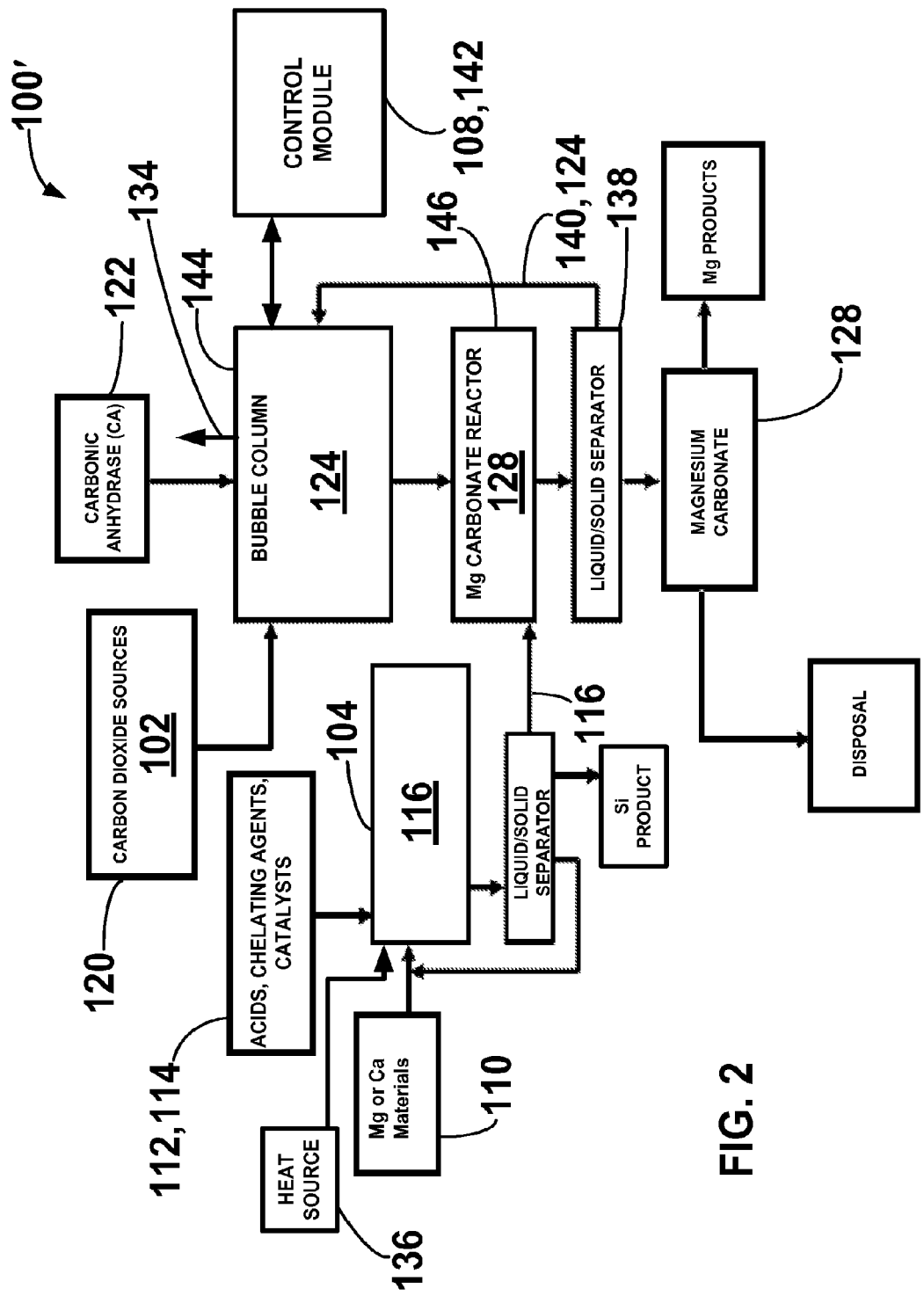
FIG. 2 is a schematic diagram of methods and systems according to some embodiments of the disclosed subject matter.

Referring now to FIG. 2, in some embodiments, a system 100' includes a biocatalyst reactor 144 that is separate and independent from a carbonation reactor 146. In some embodiments, reactor 144 is a bubble column. System 100' is otherwise substantially the same as system 100 as indicated by like element numbers.

Figure 3:
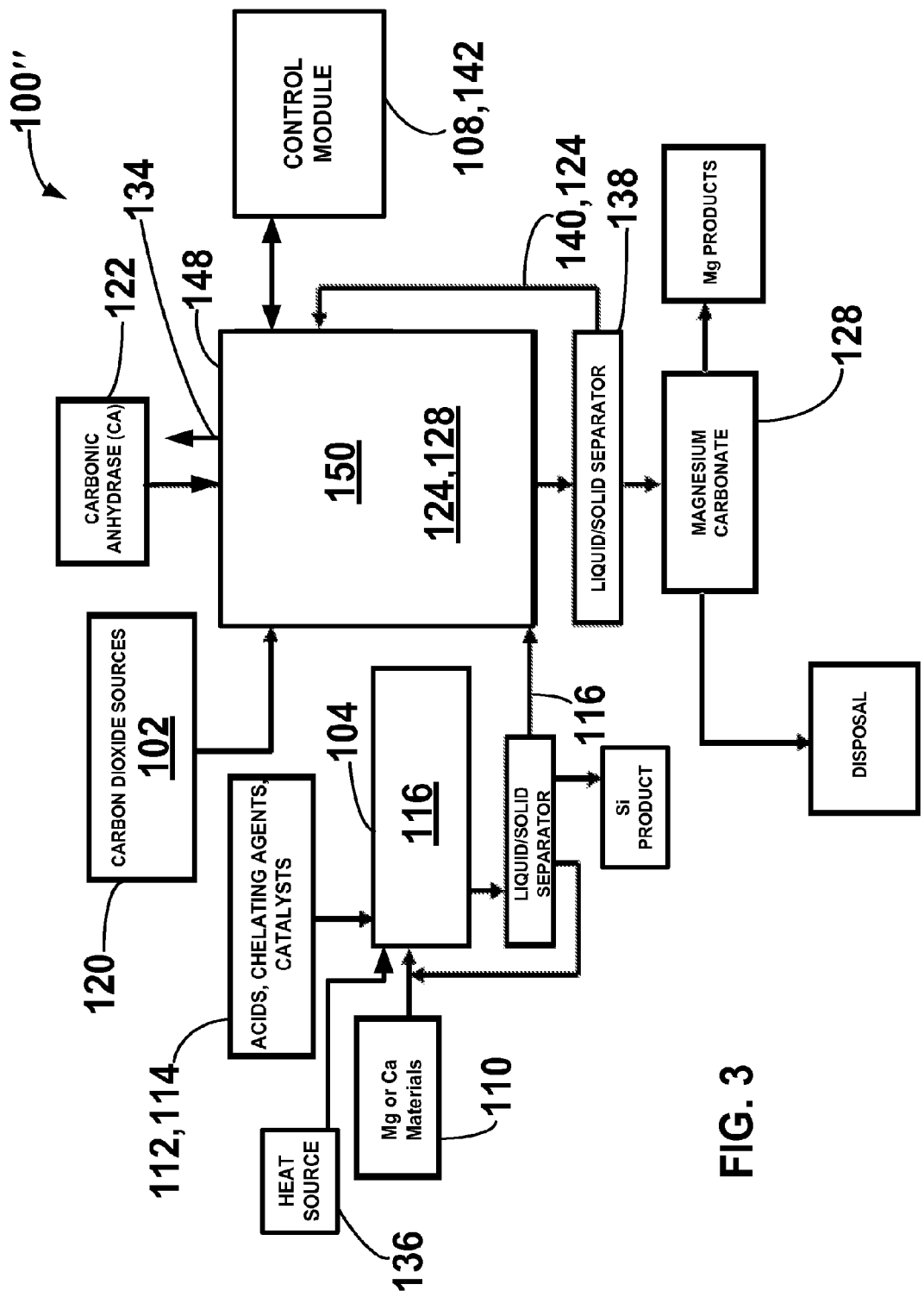
FIG. 3 is a schematic diagram of methods and systems according to some embodiments of the disclosed subject matter.

Referring now to FIG. 3, in some embodiments, a system 100" includes a combined biocatalyst and carbonation reactor 148 that has a single chamber 150. System 100" is otherwise substantially the same as systems 100 and 100' as indicated by like element numbers.

Figure 4:
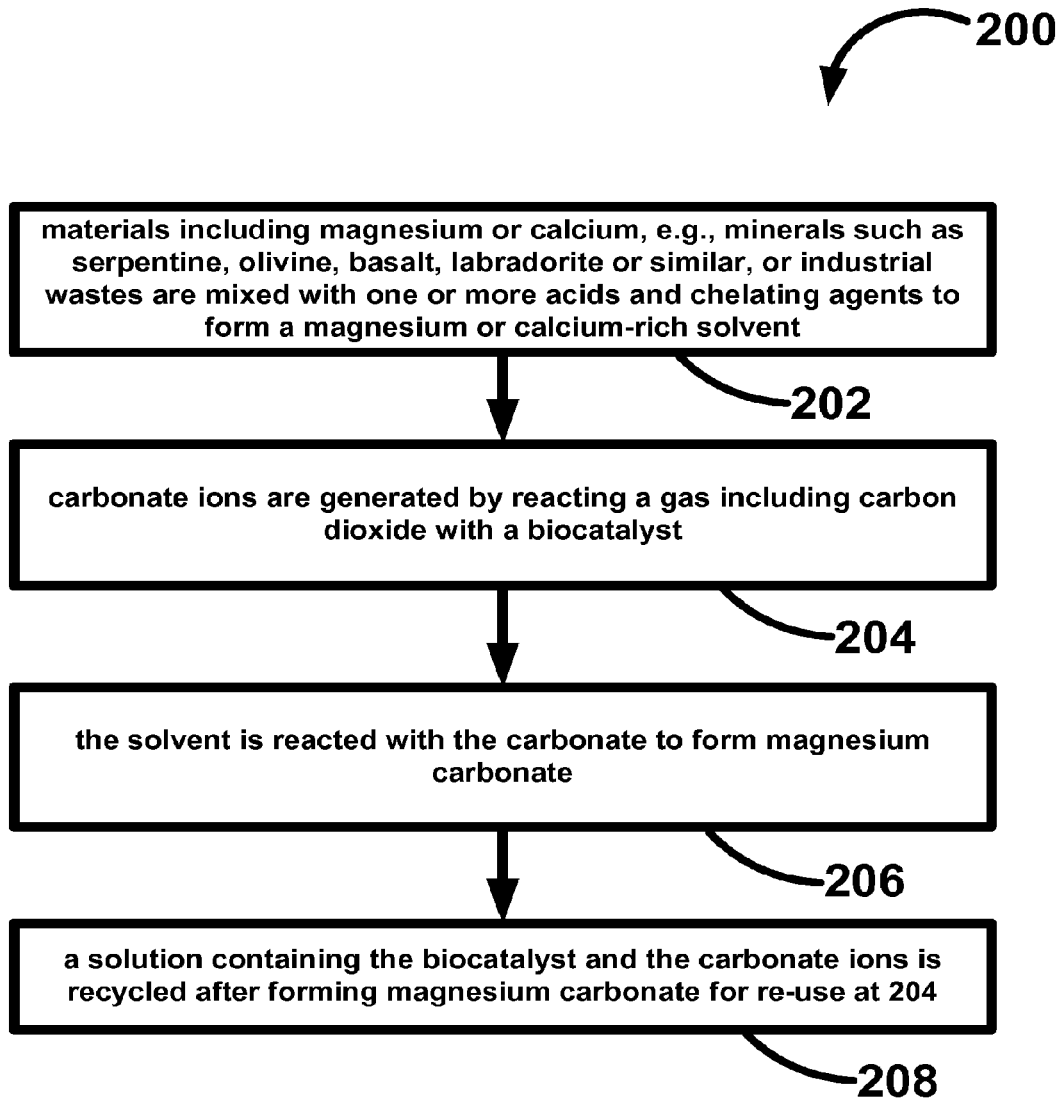
FIG. 4 is a chart of a method according to some embodiments of the disclosed subject matter.

Referring now to FIG. 4, some embodiments of the disclosed subject matter include a method 200 of capturing and storing carbon dioxide. At 202, materials including magnesium or calcium, e.g., serpentine, olivine, basalt, labradorite, industrial wastes, or similar, are mixed with one or more acids and/or chelating agents to form a magnesium or calcium-rich solvent. Examples of the one or more chelating agents in acidic forms include at least one of ethylenediaminetetraacetic acid (EDTA), acetic acid, ascorbic acid, (ortho) phosphoric acid, oxalic acid, citric acid, succinic acid, valeric acid, glutamic acid, gluconic acid, IDA, and NTA for magnesium and calcium leaching, and one or more chelating agents including catechol, guanidine, imidazole, histidine, and arginine targeting silica layer, and a combination thereof. A number of organic acids that can be used as chelating agents are produced from biogenic wastes.

At 204, carbonate ions are generated by reacting a gas including carbon dioxide with a biocatalyst. Typically, the gas is a syngas produced from the gasification of carboneous fuel, a flue gas produced from combusting a carbonaceous fuel, a gas produced during steel manufacturing process, or a combination thereof. In some embodiments, the biocatalyst is a carbonic anhydrase such as one of the enzymes Cam or Cab. In some embodiments, the carbonic anhydrase is a whole cell that expresses one of the enzymes Cam or Cab.

At 206, the magnesium or calcium-rich solvent is reacted with the carbonate ions to form magnesium or calcium carbonates. In some embodiments, the various constituents i.e., the materials including magnesium or calcium, e.g., magnesium or calcium-bearing minerals or industrial wastes, the composition of the solvent, the reaction catalysts, and the particular biocatalyst, and the reaction time of those constituents, are selected so that the magnesium or calcium carbonates formed mimic a particular structure of calcium carbonate, e.g., one used commercially as a filler product. In some embodiments, a solid silica material having a surface area >200 $m^2/g$ remains after the magnesium is extracted from the mineral. Another source of Si product would be the precipitated silica from the process water. The silica products mimic precipitate silica or fume silica and are used as filler materials for rubber, green tires, adhesives, sealants, pharmaceuticals, cosmetics, paints, plastics, etc. They can also be used as inexpensive absorbents. In some embodiments, the pH in the reactor is maintained at about 7.5 to about 10 during the reaction between the solvent and the carbonate. In some embodiments, the reaction between the solvent and the carbonate ions is carried out to form the magnesium or calcium carbonates.

At 208, a solution containing the biocatalyst is recycled after forming magnesium or calcium carbonates for re-use at 204.

Methods and systems according to the disclosed subject matter offer benefits and advantages over known technology. Mineralization is especially promising because it combines capture and storage into a single step, eliminating the need for regeneration of the absorbing material, and because the solids generated containing magnesium, calcium, or silica are useful for other applications.

Methods and systems according to the disclosed subject matter allow for tailoring the structure of precipitate magnesium carbonate (MgCO3) to mimic commercially-available CaCO3-based materials, while sequestering carbon dioxide. Thus, a commercially-useful, carbon-neutral material is generated. The silica products are tailored for applications such as filler materials for rubber, green tires, adhesives, sealants, pharmaceuticals, cosmetics, paints, plastics, etc. They can also be used as inexpensive absorbents.

Using engineered biological catalysts, i.e., carbonic anhydrase, methods and systems according to the disclosed subject matter enhance the hydration of gaseous carbon dioxide and reduce the required pH for the reaction, from greater than about 9.6 to about 8.

Unlike Ca-based carbon dioxide capture using Ca-based sorbent derived from limestone, technology according to the disclosed subject matter does not require sorbent regeneration. Once carbon dioxide is captured, there is in the form that can be directly stored long term. By capturing and storing and storing carbon dioxide directly from flue gas, technology according to the disclosed subject matter improves the overall sustainability.

Technology according to the disclosed subject matter utilizes unpurified carbonic anhydrase. Generally, the cost of enzymes is expensive due to the separation and purification processes. Because in methods and systems according to the disclosed subject matter, whole cells are used for carbon dioxide hydration, the overall cost of the technology is also lowered. The particle size and morphological structure of magnesium or calcium carbonates can also be engineered to mimic those of precipitated calcium carbonates, which are currently used as filler materials.

Although the disclosed subject matter has been described and illustrated with respect to embodiments thereof, it should be understood by those skilled in the art that features of the disclosed embodiments can be combined, rearranged, etc., to produce additional embodiments within the scope of the invention, and that various other changes, omissions, and additions may be made therein and thereto, without parting from the spirit and scope of the present invention.

What is claimed is:

1. A method of capturing and storing carbon dioxide, said method comprising:
   providing a dissolution reactor;
   mixing materials including magnesium or calcium with one or more acids and catechol to form a magnesium or calcium-rich solvent in said dissolution reactor;
   providing a combined biocatalyst and carbonation reactor in fluid communication with said dissolution reactor;
   generating carbonate ions by reacting a gas including carbon dioxide with a biocatalyst in said biocatalyst and carbonation reactor;
   providing the solvent to said biocatalyst and carbonation reactor; and
   reacting said solvent with said carbonate ions to form magnesium or calcium carbonates in said biocatalyst and carbonation reactor.

2. The method according to claim 1, further comprising:
   recycling a solution containing said biocatalyst after forming said magnesium or calcium carbonates for re-use in said generating step.

3. The method according to claim 1, wherein said biocatalyst is a carbonic anhydrase.

4. The method according to claim 3, wherein said carbonic anhydrase is one of the enzymes Cam or Cab.

5. The method according to claim 3, wherein said carbonic anhydrase is a whole cell that expresses one of the enzymes Cam or Cab.

6. The method according to claim 1, wherein said magnesium or calcium materials include at least one of magnesium or calcium bearing minerals and industrial wastes.

7. The method according to claim 1, wherein said magnesium or calcium carbonates are formed so as to mimic a particular structure of calcium carbonate.

8. The method according to claim 1, wherein said silica product is formed so as to mimic a particular structure of precipitated silica or fume silica.

9. The method according to claim 1, wherein said one or more acids is produced from biogenic wastes.

10. The method according to claim 1, wherein a pH in said biocatalyst and carbonation reactor is from about 7.5 to about 10.

11. The method according to claim 1, wherein a solid silica material having surface area greater than 200 m/g remains after magnesium is extracted from said minerals to form said solvent.

12. The method according to claim 1, wherein said gas is one of a syngas produced from the gasification of carboneous fuel, a flue gas produced from combusting a carbonaceous fuel, a gas stream from steel manufacturing process, and a combination thereof.

13. A method of capturing and storing carbon dioxide, said method comprising:
   providing a dissolution reactor;
   mixing materials including magnesium or calcium with one or more acids and catechol to form a magnesium or calcium-rich solvent in said dissolution reactor;
   providing a combined biocatalyst and carbonation reactor in fluid communication with said dissolution reactor;
   generating carbonate ions by reacting a gas including carbon dioxide with a carbonic anhydrase biocatalyst in said biocatalyst and carbonation reactor;
   reacting said solvent with said carbonate ions to form magnesium or calcium carbonates in said biocatalyst and carbonation reactor; and
   recycling a solution containing said biocatalyst after forming magnesium or calcium carbonates for re-use in said dissolution reactor;
   wherein said carbonic anhydrase biocatalyst is one of the enzymes Cam or Cab or a whole cell that expresses one of the enzymes Cam or Cab.

* * * * *